US012219667B2

(12) United States Patent
Baset et al.

(10) Patent No.: US 12,219,667 B2
(45) Date of Patent: Feb. 4, 2025

(54) PROCESSING FLOWS AND RELATED SYSTEMS AND METHODS ARE DISCLOSED

(71) Applicants: Battelle Energy Alliance, LLC, Idaho Falls, ID (US); University of Utah Research Foundation, Salt Lake City, UT (US); Dawn Ramirez, Shelley, ID (US)

(72) Inventors: Aniqua Z. Baset, Salt Lake City, UT (US); Christopher D. Becker, Aitkin, MN (US); Samuel Ramirez, Shelley, ID (US); Sneha K. Kasera, Salt Lake City, UT (US); Kurt W. Derr, Idaho Falls, ID (US)

(73) Assignees: Battelle Energy Alliance, LLC, Idaho Falls, ID (US); University of Utah Research Foundation, Salt Lake City, UT (US)

( * ) Notice: Subject to any disclaimer, the term of this patent is extended or adjusted under 35 U.S.C. 154(b) by 343 days.

(21) Appl. No.: 17/755,299

(22) PCT Filed: Oct. 30, 2020

(86) PCT No.: PCT/US2020/058231
§ 371 (c)(1),
(2) Date: Apr. 26, 2022

(87) PCT Pub. No.: WO2021/087272
PCT Pub. Date: May 6, 2021

(65) Prior Publication Data
US 2022/0377845 A1 Nov. 24, 2022

Related U.S. Application Data

(60) Provisional application No. 62/928,834, filed on Oct. 31, 2019.

(51) Int. Cl.
*H04W 88/12* (2009.01)
*H04W 12/12* (2021.01)
(Continued)

(52) U.S. Cl.
CPC .......... *H04W 88/12* (2013.01); *H04W 12/12* (2013.01); *H04W 24/08* (2013.01); *H04W 24/10* (2013.01); *H04W 88/085* (2013.01)

(58) Field of Classification Search
CPC ..... H04W 88/12; H04W 24/08; H04W 24/10; H04W 88/085; H04W 12/12; H04W 12/64; H04L 43/06
See application file for complete search history.

(56) References Cited

U.S. PATENT DOCUMENTS 7,373,121 B1    5/2008  Bahai
7,626,932 B2 * 12/2009  Tuulos ................. H04L 47/824
                                                  370/235

(Continued)

OTHER PUBLICATIONS

International Search Report from International Application No. PCT/US2020/058231, mailed Feb. 1, 2021, 2 pages.

(Continued)

*Primary Examiner* — Jenee Holland
(74) *Attorney, Agent, or Firm* — TraskBritt

(57) ABSTRACT

Processing flows and related systems and methods are disclosed. A computing system includes one or more data interfaces, one or more other components, and a controller. The one or more data interfaces are configured to provide an interface to a data source. The one or more other components include one or more controller plugins, one or more processing nodes, or both the one or more controller plugins and the one or more processing nodes. The controller is configured to manage interactions between the one or more data interfaces and the one or more other components and enable a user to chain together the one or more data interfaces and (Continued)

the one or more other components according to one or more flows. The one or more controller plugins are configured to provide results of the one or more flows to one of a user interface and a system interface.

14 Claims, 8 Drawing Sheets

(51) Int. Cl.
*H04W 24/08* (2009.01)
*H04W 24/10* (2009.01)
*H04W 88/08* (2009.01)

(56) References Cited

U.S. PATENT DOCUMENTS

| | | | | |
|---|---|---|---|---|
| 8,174,994 B2* | 5/2012 | Forssell | ............... | H04W 88/06 |
| | | | | 370/465 |
| 11,522,776 B1* | 12/2022 | Pai | ...................... | H04L 43/0864 |
| 2004/0137915 A1* | 7/2004 | Diener | ................. | H04W 24/00 |
| | | | | 455/456.1 |
| 2006/0038677 A1* | 2/2006 | Diener | ................. | H04W 12/64 |
| | | | | 340/540 |
| 2006/0123133 A1* | 6/2006 | Hrastar | .............. | H04L 63/1491 |
| | | | | 709/240 |
| 2008/0043993 A1* | 2/2008 | Johnson | ............... | H04W 12/08 |
| | | | | 379/386 |
| 2009/0247122 A1* | 10/2009 | Fitzgerald | ............... | G06F 21/88 |
| | | | | 455/410 |
| 2009/0253406 A1* | 10/2009 | Fitzgerald | ........... | H04W 12/082 |
| | | | | 455/410 |
| 2013/0279335 A1* | 10/2013 | Ahmadi | .................. | H04L 47/34 |
| | | | | 370/235 |
| 2014/0092884 A1* | 4/2014 | Murphy | .............. | H04L 41/0806 |
| | | | | 370/338 |
| 2014/0169177 A1* | 6/2014 | Popescu | ............. | H04B 17/0085 |
| | | | | 370/241 |
| 2015/0295949 A1* | 10/2015 | Chizeck | ................. | G16H 40/67 |
| | | | | 726/23 |
| 2015/0350914 A1 | 12/2015 | Baxley et al. | | |
| 2016/0127931 A1* | 5/2016 | Baxley | ...................... | G06T 7/60 |
| | | | | 455/67.16 |
| 2017/0161347 A1* | 6/2017 | Raza | ....................... | H04L 67/01 |
| 2018/0295519 A1* | 10/2018 | Nandha Premnath | ....................... | |
| | | | | H04L 63/1425 |
| 2019/0028534 A1 | 1/2019 | Bloomquist et al. | | |
| 2020/0213855 A1* | 7/2020 | Yi | ........................ | H04L 63/0861 |
| 2020/0252802 A1* | 8/2020 | Pachauri | ............... | H04W 12/12 |
| 2020/0389469 A1* | 12/2020 | Litichever | ............. | H04W 4/40 |
| 2021/0111968 A1* | 4/2021 | Clarke | ................. | H04L 43/0817 |
| 2021/0409297 A1* | 12/2021 | Sherazi | ............... | H04L 43/0817 |

OTHER PUBLICATIONS

International Written Opinion from International Application No. PCT/US2020/058231, mailed Feb. 1, 2021, 7 pages.

* cited by examiner

PROCESSING FLOWS AND RELATED SYSTEMS AND METHODS ARE DISCLOSED

CROSS-REFERENCE TO RELATED APPLICATIONS

This application is a national phase entry under 35 U.S.C. § 371 of International Patent Application PCT/US2020/058231, filed Oct. 30, 2020, designating the United States of America and published as International Patent Publication WO 2021/087272 A1 on May 6, 2021, which claims the benefit under Article 8 of the Patent Cooperation Treaty to U.S. Patent Application Ser. No. 62/928,834, filed Oct. 31, 2019, the entire disclosures of which are hereby incorporated herein by reference.

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

TECHNICAL FIELD

This disclosure relates generally to flexible processing flows, and more specifically to a controller configured to operate components (e.g., data interfaces, processing nodes, and controller plugins) according to flows.

BACKGROUND

With an expanding wireless revolution fueled by the Internet of Things (IoT), autonomous cars, and software defined radios (SDRs), the need to monitor the wireless environment in real-time is becoming paramount in a variety of important applications. For instance, the Federal Communications Commission (FCC) announced using the 3.5 GHz band with a Spectrum Access System (SAS) to implement a shared spectrum model with controlled access to the band. This model includes three tiers of access levels for users. The highest tier of users is Incumbent users (e.g., naval radars), who are guaranteed to have interference-free access to the band when desired. The middle tier of users is Priority Access License (PAL) users, who have prioritized access to parts of the band not currently being used by Incumbent users. The lowest tier of users is Generalized Authorized Access (GAA) users, who are not guaranteed an interference-free environment and may only use parts of the band not currently being used by Incumbent or PAL users. In order for this model to work, the SAS should be able to quickly and reliably detect the presence of different users (i.e., Incumbent, PAL, and GAA users) to enforce the required spectrum sharing policies.

There are several other applications that can benefit from the capability to monitor the wireless environment in real-time. At airports the presence of unauthorized signals may indicate a potential danger and require action to be taken to protect lives. In high security and control system environments including facilities such as power plants, military bases, and water treatment plants, having continuous situational awareness of the wireless environment is important. The presence of unauthorized signals may indicate the presence of an adversary. The removal of authorized signals may indicate the presence of an adversary or system issues that should be addressed quickly to avoid serious consequences such as system failure or a breach. Devices that do not act as intended, including emitting additional signals, can cause interference or other problems in these environments.

BRIEF SUMMARY

In some embodiments a computing system includes one or more data interfaces, one or more other components, and a controller. The one or more data interfaces are configured to provide an interface to a data source. The one or more other components include one or more controller plugins, one or more processing nodes, or both the one or more controller plugins and the one or more processing nodes. The controller is configured to manage interactions between the one or more data interfaces and the one or more other components and enable a user to chain together the one or more data interfaces and the one or more other components according to one or more flows. The one or more controller plugins are configured to provide results of the one or more flows to one of a user interface and a system interface.

In some embodiments a method of operating a computing system includes registering one or more data interfaces with a controller, registering one or more other components, and operating at least a portion of the one or more data interfaces and the one or more other components according to one or more flows managed by the controller. The one or more other components include one or more controller plugins, one or more processing nodes, or both the one or more controller plugins and the one or more processing nodes.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION

Figure 1:
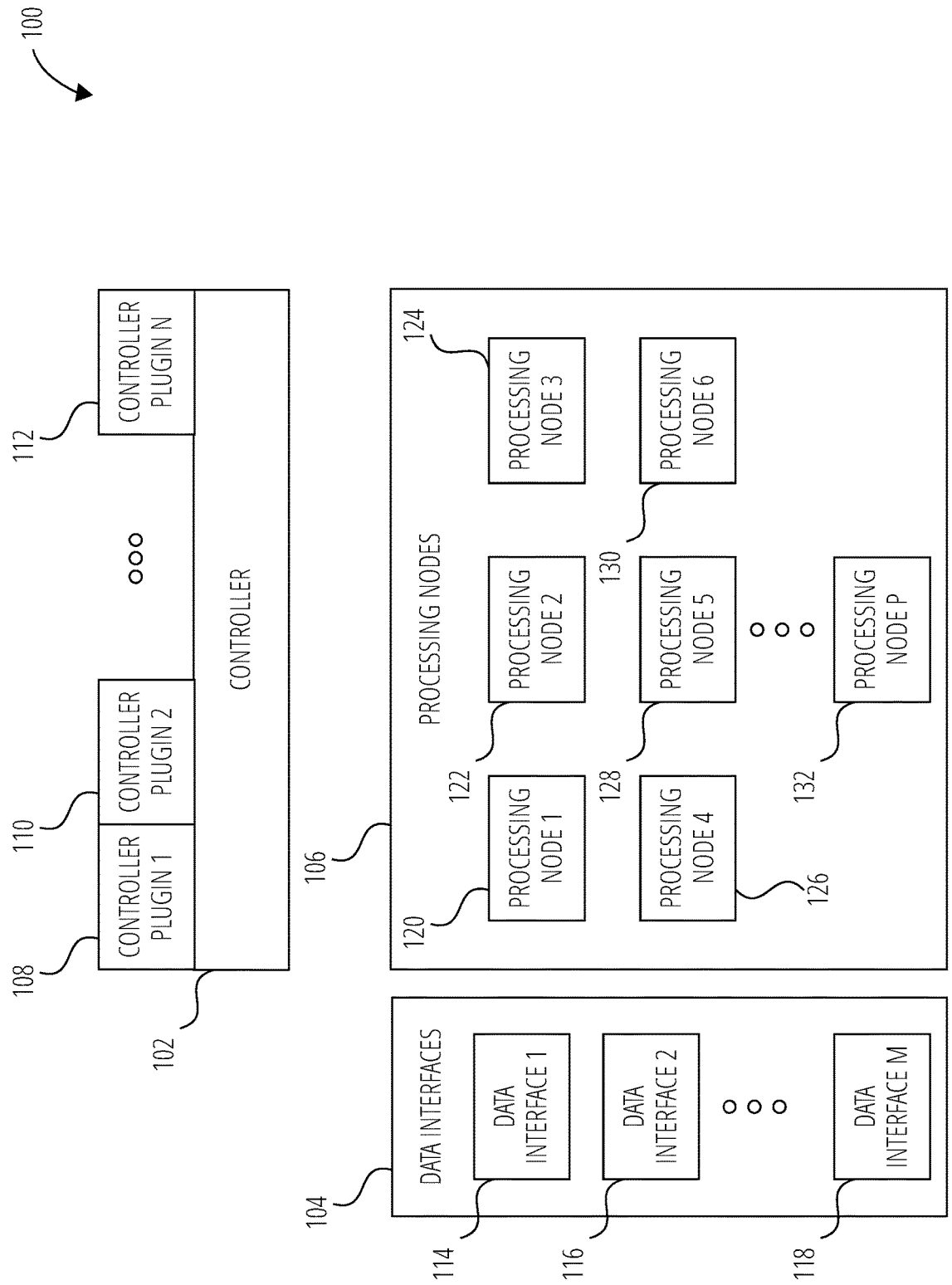
FIG. 1 is a block diagram of a signal classification system, according to some embodiments.

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments enabled herein may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. In some instances similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

It will be readily understood that the components of the embodiments as generally described herein and illustrated in the drawings could be arranged and designed in a wide variety of different configurations. Thus, the following description of various embodiments is not intended to limit the scope of the present disclosure, but is merely representative of various embodiments. While the various aspects of the embodiments may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art will understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may include one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

With an expanding wireless revolution fueled by Internet of Things (IoT), autonomous cars, and software defined radios (SDRs), the need to monitor the wireless environment in real-time is becoming paramount in a variety of important applications. GNU Radio enables real-time processing and provides some plug and play capabilities by use of out of tree module development and flowgraphs. However, generally this approach is designed to not be distributed and has multiple performance problems. GNU Radio is solely focused on signal processing and designed to work with only a limited number of input and output types. While GNU Radio may be used to implement parts of embodiments disclosed herein, architectures according to embodiments disclosed herein do not rely on GNU Radio and may incorporate other capabilities, provide better performance feedback, handle a wider variety of input and output types, and is designed to be distributed.

Disclosed herein is a scalable plug and play real-time signal classification and processing architecture motivated by these important applications. While many existing works focus on specific signal classification techniques, disclosed herein is a robust and flexible architecture that enables classification of a wide range of signals. A distributed architecture allows processing components to be mixed and matched in a variety of configurations to best suit the classification and processing requirements of the desired application. This includes allowing the use of heterogeneous processing capabilities. Processing is done through the use of processing flows, which can be modified dynamically, allowing flexibility at runtime. In contrast to focusing on signal classification techniques, embodiments disclosed herein emphasize providing a robust and flexible signal processing architecture useful in many scenarios. Architectures disclosed herein can be used in a variety of scenarios to detect unauthorized wireless activities at or near airports, power substations, and shared wireless spectrum systems.

A prototype implementation demonstrates the practicality and utility of the disclosed architecture. The architecture is evaluated in terms of both processing and networking throughput. Up to 20 MHz of bandwidth from a software defined radio (e.g., HackRF One software defined radio) as 32-bit IQ samples may be processed in some instances. When components are on the same machine, over 99.99% of the samples at that sample rate may be transferred between components during a fifteen minute period.

FIG. 1 is a block diagram of a signal classification system 100, according to some embodiments. The signal classification system 100 of FIG. 1 may be used as a standalone system or integrated into a larger system, such as a SAS. The signal classification system 100 includes a controller 102 (and associated plugins such as controller plugin 1 108, controller plugin 2 110, . . . controller plugin N 112), data interfaces 104 (e.g., data interface 1 114, data interface 2, 116, . . . , data interface M 118), and processing nodes 106 (e.g., processing node 1 120, processing node 2 122, processing node 3 124, processing node 4 126, processing node 5 128, processing node 6 130, . . . , and processing node P 132). The controller plugin 1 108, controller plugin 2 110, . . . and controller plugin N 112 sit on top of the controller 102 itself to provide an interface between a user or another system and the signal classification system 100. The controller 102, the data interfaces 104, and the processing nodes 106 may be part of a single machine or may be distributed across multiple machines.

The controller 102 is configured to handle interactions between system components. The interactions may include registration, configuration, activation requests, other interactions, and combinations thereof. The controller plugins 108, 110, . . . 112 are configured to provide a user interface and/or a system interface with the rest of the signal classification system 100.

The data interfaces 104 are configured to provide an interface to an underlying data source such as an SDR or other streaming sources that can be used by the signal classification system 100 to classify signals or otherwise process data in a variety of ways. The data interfaces 104 may include, for example, data interface 1 114, data interface 2 116, . . . , and data interface M 118. SDR controllers are examples of a subtype of the data interfaces 104. Other types of the data interfaces 104 include other programs, databases, files, etc.

The processing nodes 106 are configured to provide data processing capabilities to the signal classification system 100. The processing nodes 106 may include processing node 1 120, processing node 2 122, processing node 3 124, processing node 4 126, processing node 5 128, processing node 6 130, . . . , and processing node P 132. Non-limiting examples of capabilities of the processing nodes 106 include signal demodulation, reverse engineering, recording, other capabilities, and combinations thereof. The processing nodes 106 may also be chained together to provide processing flows.

As components (e.g., controller plugins 108-112, data interfaces 104, and processing nodes 106) of the signal classification system 100 come online, they register with the controller 102 and await further commands. Part of the registration process includes the components providing information about themselves. For example, for one of the data interfaces 104, information such as its device position (e.g., GPS coordinates), capabilities including receive and transmit capabilities, and configuration options may be sent. As another example, for one of the processing nodes 106, examples of data sent during registration may include types of processing capabilities possessed by the one of the processing nodes 106 (e.g., classification, signal demodulation, etc.) and configuration options for those capabilities. Configuration options may be sent in a format such that a wide variety of option types are available to the components and new components may be added to the system without changes being made to the core system and without the core system having much, if any, knowledge about the plugin (e.g., which SDR hardware is being used and what type of processing capabilities are desired). This allows the signal classification system 100 to adapt over time without additional development effort to the core system.

Processing flows allow components (e.g., data interfaces 104, processing nodes 106, and/or controller plugins 108-112) to be chained together. Each component provides input and/or output functionalities in terms of ports. Each port has an associated data type. Components may be chained together when the output type of the previous (source) node port matches the input type of the current (destination) node port. Each node queues data to be forwarded to the next attached node or nodes in the flow. Data interface nodes (e.g., the data interfaces 104) may contain both input and output functionality as appropriate for the data source. Processing nodes 106 have input functionality and may have output functionality as well. Controller plugins 108-112 provide input functionality for receiving data from the system and output functionality for interacting with either the user or another system. Data types are not hard-coded into the system. Rather, a string representation is used, allowing data types to be set by the components (e.g., component plugins) and allowing the components to agree upon them. This allows the system to evolve with new data types without changing the core.

As used herein, the term "flow" refers to a set of configured nodes (e.g., data interfaces 104, processing nodes 106, controller plugins 108-112) and connections between the nodes. A flow may produce an acyclic graph.

Figure 2:
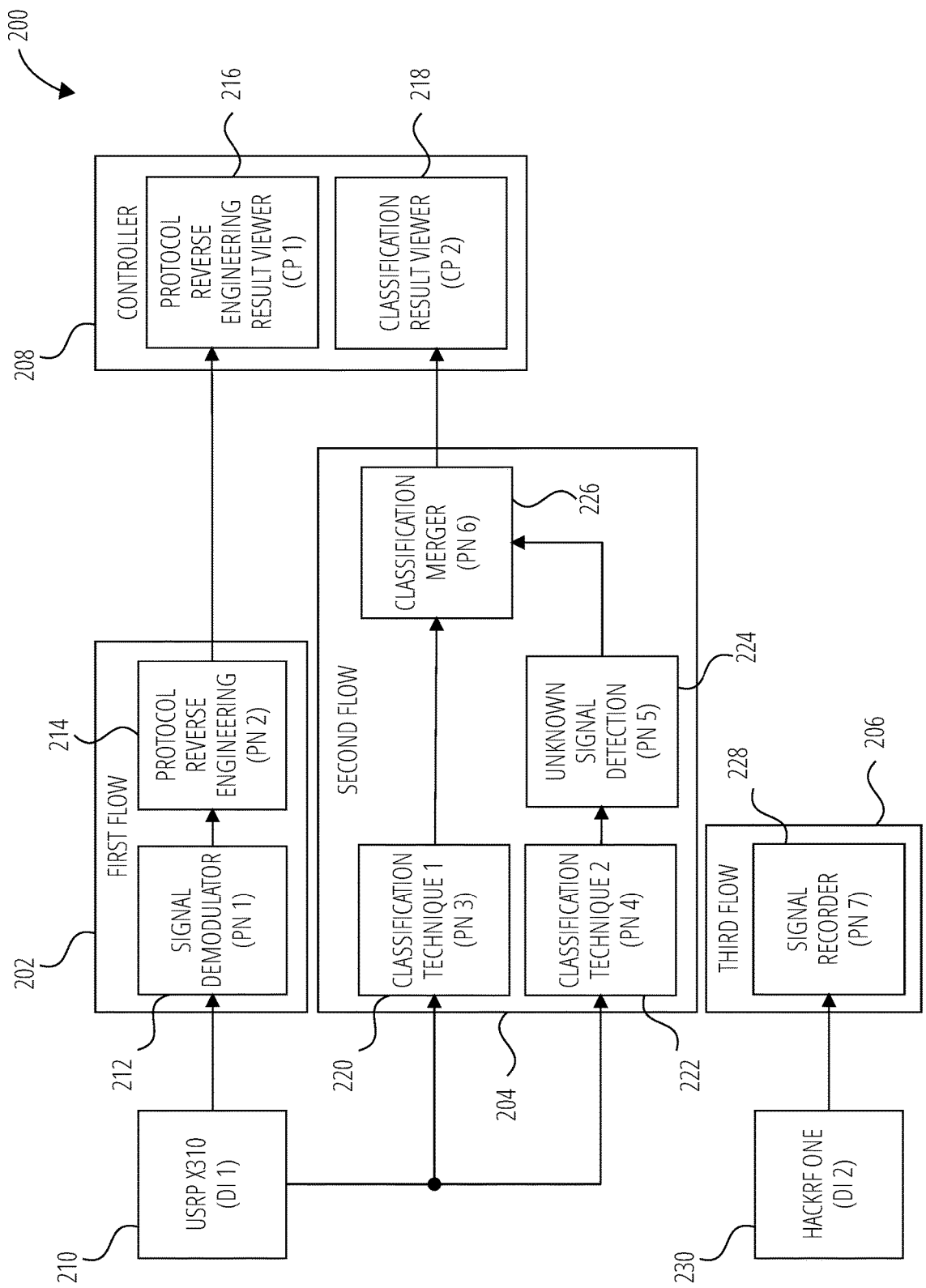
FIG. 2 illustrates an example of data processing flows, according to some embodiments.

FIG. 2 illustrates an example of data processing flows 200, according to some embodiments. Arrows in FIG. 2 show the flow of data between the components. The data processing flows 200 include a first flow 202, a second flow 204, and a third flow 206. The first flow 202 extends between a first data interface 210 and a first controller plugin 216 of a controller 208. The first data interface 210 may include, for example, a USRP X310 software defined radio. The first controller plugin 216 may include a protocol reverse engineering result viewer. The first flow 202 includes a first processing node 212 and a second processing node 214. The first processing node 212 may include a signal demodulator. The second processing node 214 may include a protocol reverse engineering node. For the first flow 202 samples are sent from the first data interface 210 (USRP X310 SDR) to the first processing node 212 (signal demodulator). Results from the signal demodulator are sent to the second processing node 214 (protocol reverse engineering). Results from the protocol reverse engineering are sent to the first controller plugin 216 to be presented to a user.

The second flow 204 extends between the first data interface 210 and a second controller plugin 218 of the controller 208. The second controller plugin 218 includes a classification result viewer. The second flow 204 includes a third processing node 220 between the first data interface 210 and a sixth processing node 226. The third processing node 220 includes a classification technique 1 node. The sixth processing node 226 includes a classification merger. The second flow 204 also includes a fourth processing node 222 and a fifth processing node 224 between the first data interface 210 and the sixth processing node 226. The fourth processing node 222 includes a classification technique 2 node, and the fifth processing node 224 includes an unknown signal detection node.

For the second flow 204 the samples that are sent to the first processing node 212 (signal demodulator) of the first flow 202 are also sent to two different classification techniques: the third processing node 220 (classification technique 1) and the fourth processing node 222 (classification technique 2). Results from the fourth processing node 222 (classification technique 2) are further processed by the fifth processing node 224 (unknown signal detection) to determine if any additional unknown signals have been detected. Results from the third processing node 220 (classification technique 1) and the fifth processing node 224 (unknown signal detection) are sent to the sixth processing node 226 (classification merger). This merger process takes the results from the different inputs (i.e., results from the third processing node 220 and the fifth processing node 224) and combines them. The combined results are sent to the second controller plugin 218 (classification result viewer) to be presented to a user.

The third flow 206 includes a seventh processing node 228 connected to a second data interface 230. The second data interface 230 includes a software defined radio (e.g., HackRF One software defined radio) and the seventh processing node 228 includes a signal recorder. For the seventh processing node 228 samples from the second data interface 230 (HackRF One SDR) are sent to the seventh processing node 228 (signal recorder) to be saved in storage.

As may be observed in the example illustrated in FIG. 2, one source node may send results to multiple nodes (e.g., from the first data interface 210 to the first processing node 212 of the first flow 202 and to the third processing node 220 and the fourth processing node 222 of the second flow 204) and nodes may accept input from several sources (e.g., sixth processing node 226 of the second flow 204). Also, it may be observed that in some instances a flow may not involve a controller plugin (e.g., the third flow 206).

In some instances, a flow may include a dynamic flow, which is a flow that may be dynamically changed.

Figure 3:
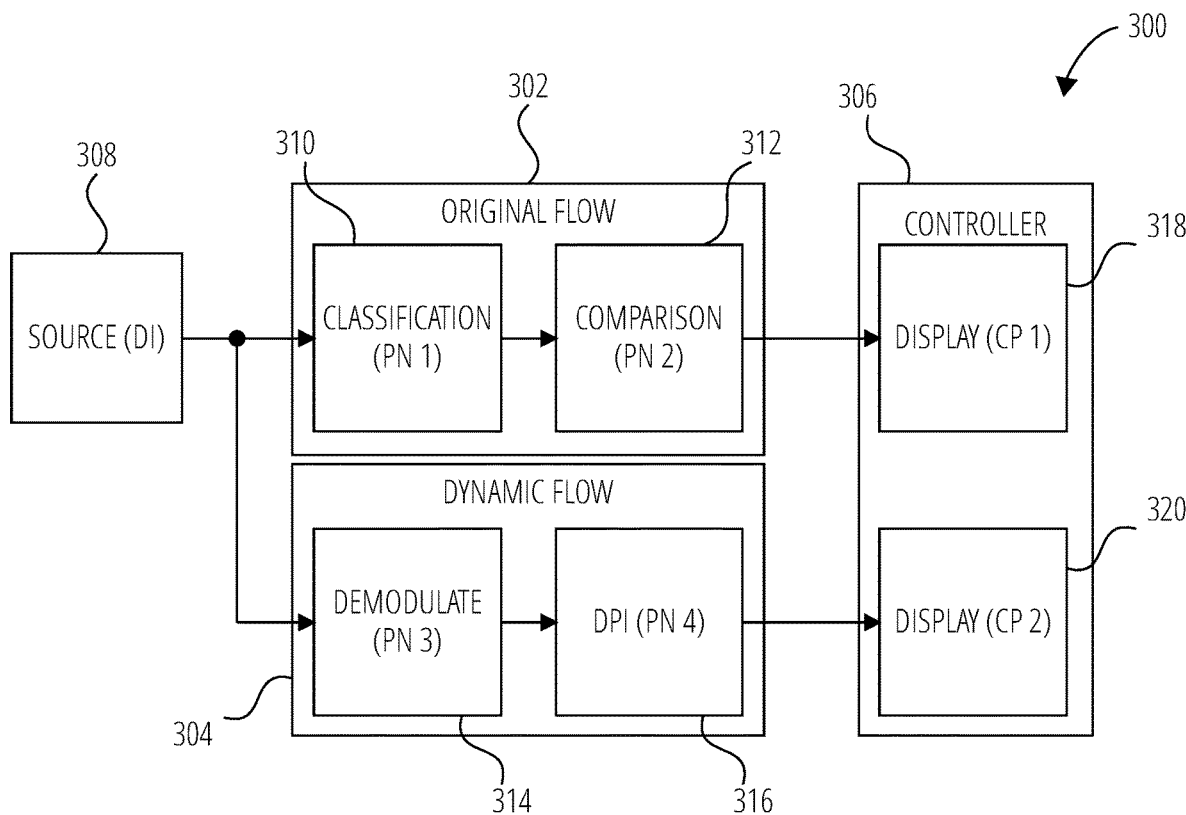
FIG. 3 illustrates an example of flows including a dynamic flow, according to some embodiments.

FIG. 3 illustrates an example of flows 300 including a dynamic flow 304, according to some embodiments. The flows 300 includes an original flow 302 and the dynamic flow 304, which may have been added to the flows 300 to provide additional processing. The arrows in FIG. 3 may show the data flow between components. The original flow 302 extends between a data interface 308 (e.g., a source) and a first controller plugin 318 (e.g., a display) of a controller 306. The original flow 302 includes a first processing node 310 (a classification node) and a second processing node 312 (a comparison node). The original flow 302 takes samples from the data interface 308 (source), and passes the samples to the first processing node 310 (classification) to provide classification of the signals. The classification results are passed to the second processing node 312 (comparison), which provides a baseline comparison. The comparison results are passed to the first controller plugin 318 (display) to present the comparison results to a user.

After a rogue signal is detected, without interrupting the original flow 302 a user may modify the flows 300 to add the dynamic flow 304. The dynamic flow 304 extends between the data interface 308 (source) and a second controller plugin 320 (display) of the controller 306. The dynamic flow 304 includes a third processing node 314 (demodulate) and a fourth processing node 316 (deep packet inspection (DPI)). The samples provided by the data interface 308 to the first processing node 310 may be sent to the third processing node 314 (demodulate), which demodulates the samples. The results of the demodulation are provided to the fourth processing node 316 (DPI) to perform deep packet inspection on the results of the demodulation. The results of the deep packet inspection are provided to the second controller plugin 320 (display) to present the results of the deep packet inspection to the user.

Some example environments where embodiments of the disclosure may be implemented include airports, power substations, and spectrum access systems (SASs). One concern arising from the wireless environment at an airport is that drones have led to numerous flight disruptions. If an aircraft would crash into a drone, not only could there be damage to the aircraft, but the crash could also injure or kill people. Although a drone may be visually sighted, detection of drones based on their wireless communications would leave less to chance than visually looking for drones. Similarly, in an airport environment, signals are generated from the ground and broadcast to aircraft. These signals provide data used for operation. For example, the instrument landing system (ILS) is a landing navigation aid that provides both vertical and horizontal guidance information for aircraft as they land. Jamming of this system, or worse, the overriding of this signal could be catastrophic for landing aircraft.

In these airport scenarios, SDR controllers may be deployed in and around the airport facility. Data from the SDR controllers is sent to processing nodes that may either compare current wireless environment characteristics against a baseline or specifically look for known wireless drone traffic. If anomalous signals are found by either method, further action may be taken such as confirming, alerting personnel and air traffic, or shutting down the area affected to avoid serious consequences.

In the case of a power substation, wireless environment concerns include attacks on electrical equipment. These attacks continue to take place within the United States.

Having continuous knowledge of the surrounding wireless environments may enable prevention of attacks, or help in investigating attacks. For example, attackers spend time around the equipment to scout out the locations, as well as during the attacks. Their presence may be detected if they carry equipment that transmits wireless signals (e.g., cellular phone signals). These wireless signals may be detected by systems according to embodiments disclosed herein, allowing authorities to act preemptively or more quickly. Additional information about their devices (e.g., characteristics or traffic) may be recorded to leave a forensic trail for investigators if needed after an attack.

In power substations SDR controllers may be deployed around the equipment to be protected. Data from the SDR controllers may be sent to processing nodes, which may compare current wireless environment characteristics against a baseline. If the current wireless environment differs from the baseline, additional processing and/or recording of the environment may take place via additional processing nodes being added to the processing flows (e.g., dynamic flows). Also, alerts may be sent to designated personnel notifying them of an event that merits further investigation by personnel.

In the case of a SAS system, three tiers of users share a common portion of the spectrum. The highest tier of users, incumbent users, are guaranteed interference-free access to the band when desired. The middle tier of users, PAL users, have priority access to the spectrum when and where incumbent users are not present. The bottom tier of users, GAA users, have access to the spectrum when and where incumbent and PAL users are not present and share the spectrum with other GAA users. If a higher-tier user starts to use the spectrum, lower-tier users vacate the spectrum.

In this environment, embodiments disclosed herein quickly and reliably detect the presence of higher-tiered users, detect the presence of interference sources, and determine compliance of users, particularly GAA users. The SAS may use another system to monitor the spectrum and provide information back to the SAS.

In an SAS, SDR controllers may be deployed around an area to be monitored. Embodiments disclosed herein may be used to monitor a specific part of the spectrum controlled by the SAS. In this case processing nodes may continuously run one or more classification algorithms to detect signals. If signals are detected additional processing nodes may be used to provide additional information about the signals. If higher-tiered users are detected action may be taken immediately to have lower-tier users clear the spectrum. If violations are detected the appropriate action to respond may be taken quickly.

Figure 4:
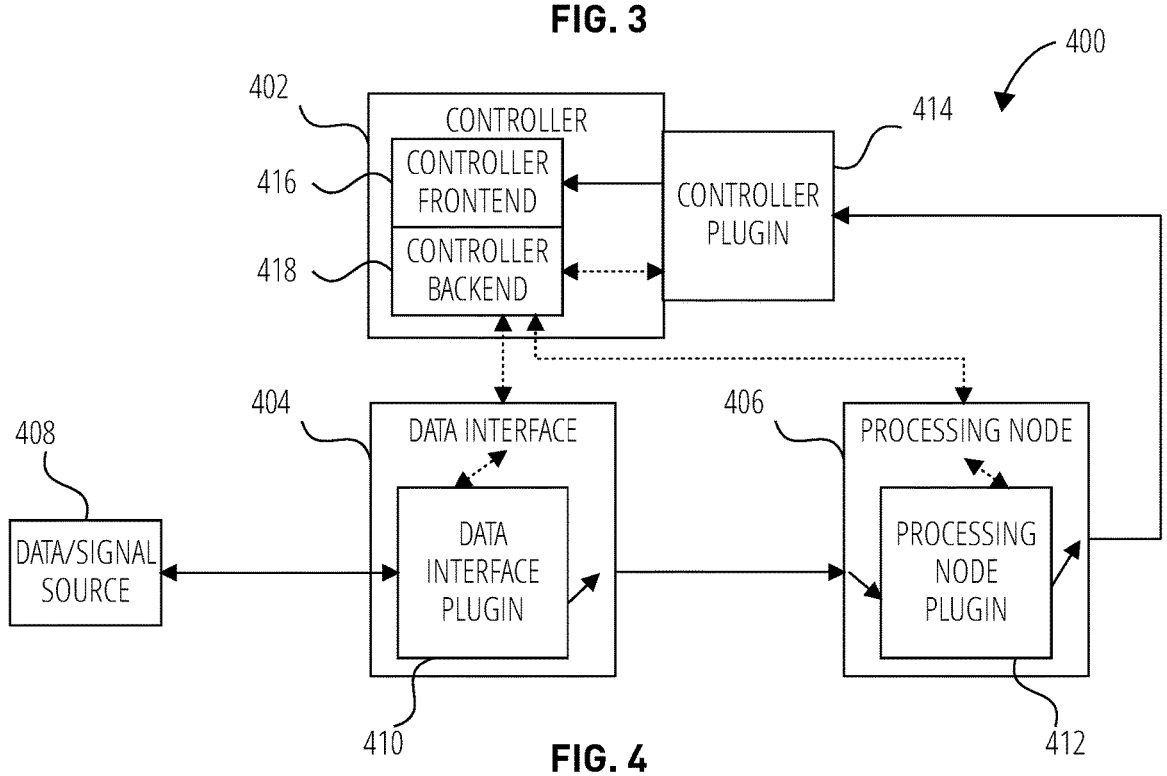
FIG. 4 illustrates a generic flow, according to some embodiments.

FIG. 4 illustrates a generic flow 400, according to some embodiments. For simplicity, the generic flow 400 of FIG. 4 includes only one instance of each type of component discussed above (i.e., a controller plugin 414 for a controller 402, a data interface 404, and a processing node 406). The controller 402 may include a controller frontend 416 and a controller backend 418. It will be understood that various other flow architectures including any number of any type of the components fall within the disclosure. Arrows having solid lines show data (e.g., sample) flow through the architecture. Arrows having broken lines show configuration and command data flow. Although a data/signal source 408 is not a component of the architecture of the generic flow 400, the data/signal source 408 is shown to illustrate its interaction with the generic flow 400.

In some embodiments the generic flow 400 may be implemented using a software programming language (e.g., C++ using the Qt framework) as three separate applications including the data interface 404, the processing node 406, and the controller 402 as well as plugins for the components (e.g., a data interface plugin 410 for the data interface 404, a processing node plugin 412 for the processing node 406, and a controller plugin 414 for the controller 402). Communication between the components may occur, for example, over hypertext transfer protocol secure (HTTPS). Commands and configuration information may use JavaScript Object Notation (JSON) format. Sample data may use a custom format. Graphic visualization software (e.g., Graphviz) may be used for flow visualization. Plugins (e.g., the data interface plugin 410, the processing node plugin 412, and the controller plugin 414) may be developed using Qt's Plugin Framework.

As illustrated in FIG. 4, the data interface 404, the processing node 406, and the controller backend 418 may handle inter-component communication, which allows the plugins (e.g., data interface plugin 410, processing node plugin 412, and controller plugin 414) to focus on data manipulation and processing. This enables the plugins and the core system (e.g., the controller 402) to be developed in relative isolation from each other, allowing changes to be made to the overall system (e.g., performance upgrades) without affecting plugin development, and changes made to plugins to occur without affecting the overall system. Data communication may be performed using a "push" style architecture. Nodes receive samples from their sources as the samples become ready.

In one example, an SQLite database using Qt's SQLite driver to manage node information may be used. The controller 402 is broken into backend and frontend components (i.e., the controller backend 418 and the controller frontend 416). The controller backend 418 may be used by multiple versions of the controller frontend 416. The controller backend 418 handles interacting with the nodes and providing updates on node information such as registration, status, etc., to the controller frontend 416. Controller plugins may be loaded based on information specified in a configuration file. The controller backend 418 may also be responsible for activating flows given a flow representation from the controller frontend 416.

Figure 5:
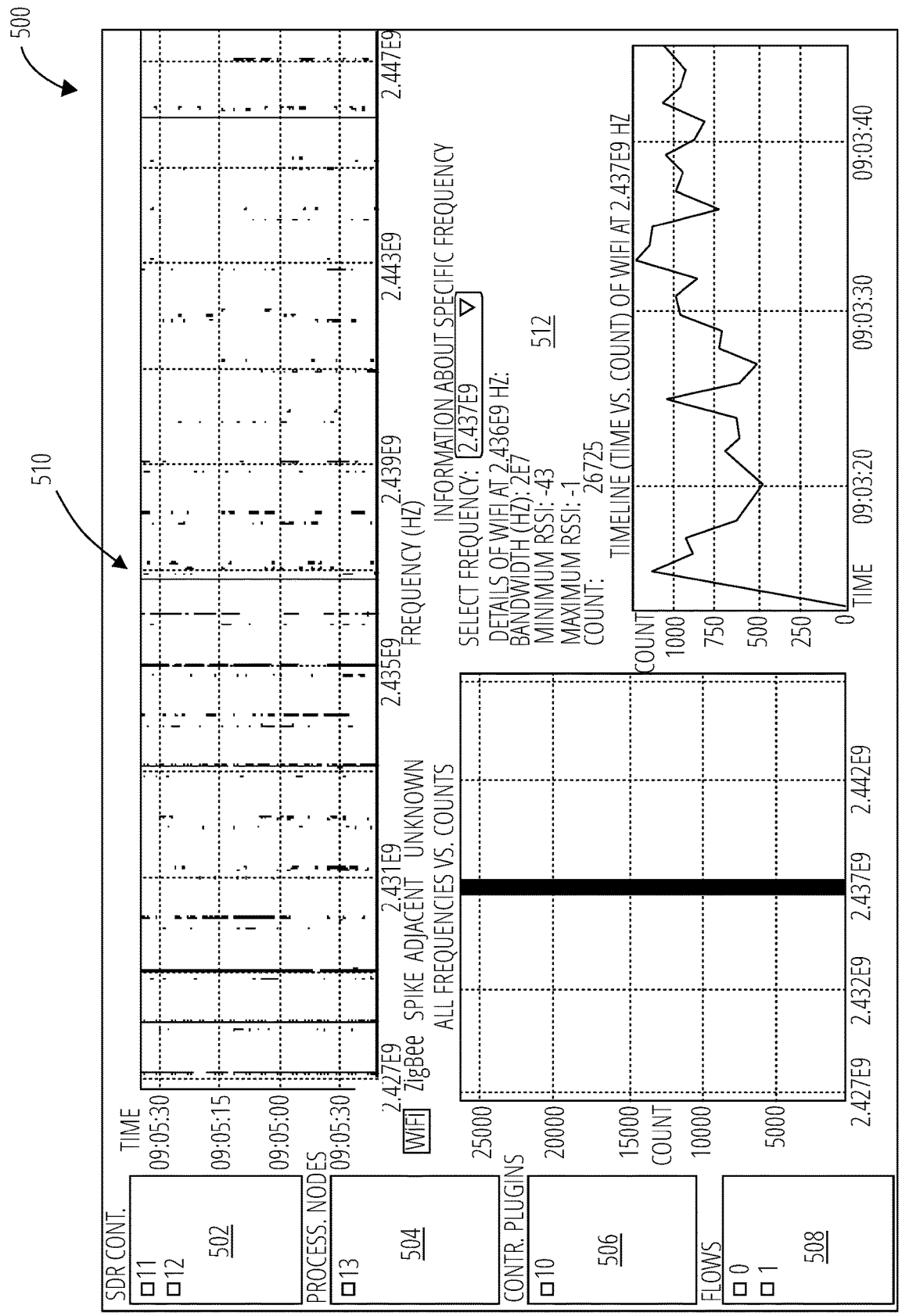
FIG. 5 is a plan view of an example of a main controller graphical user interface (GUI) with a classification result viewer plugin active.
Figure 6:
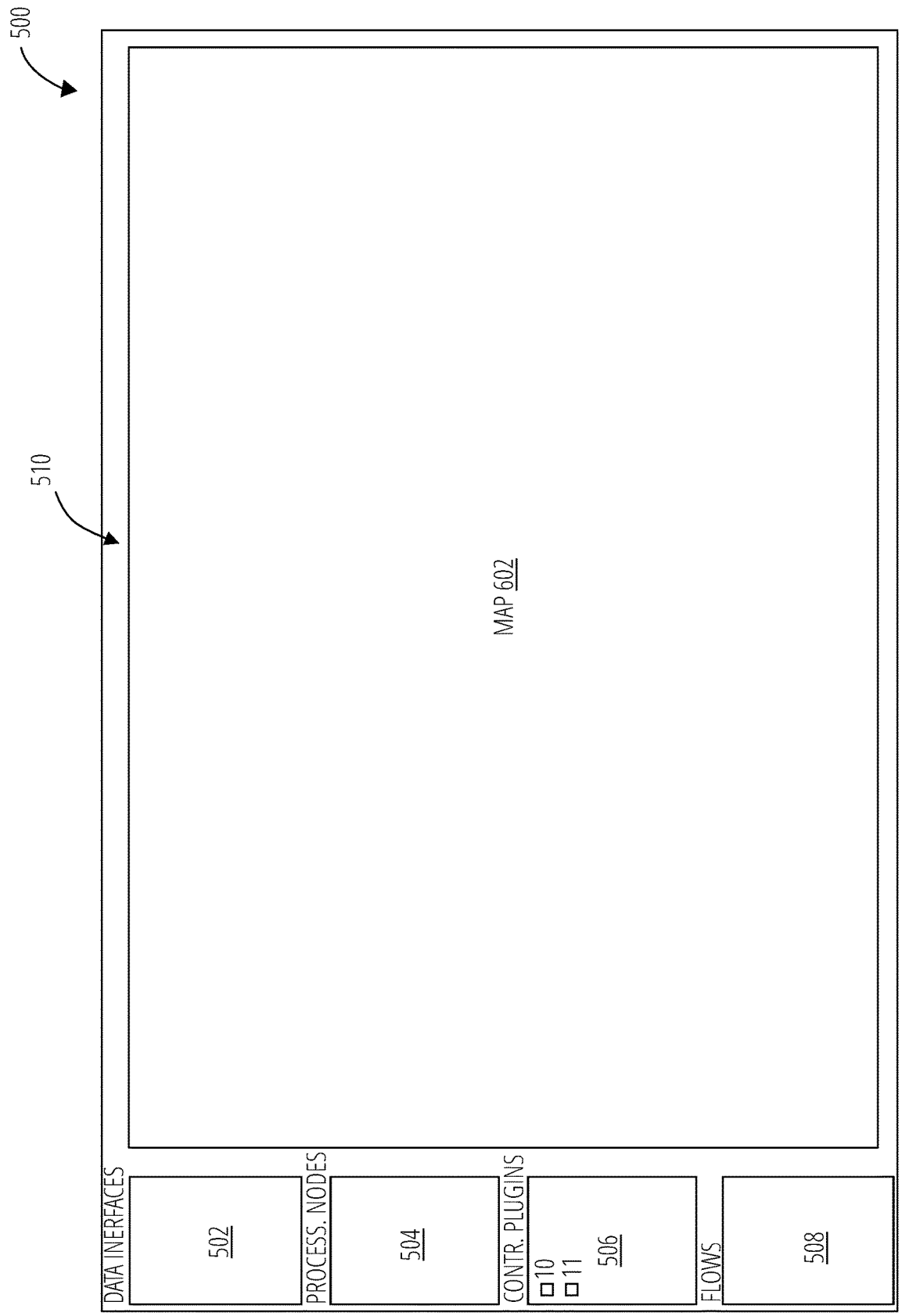
FIG. 6 is a plan view of the example of the main controller GUI with an automatic dependent surveillance-broadcast (ADS-B) mapper plugin active.

In some embodiments the controller frontend 416 implementation may provide an interface (e.g., an application programming interface (API) such as a Representational State Transfer API (REST API)) that is used by another system. In some embodiments the controller frontend 416 implementation may provide a graphical user interface (GUI) to the user. FIG. 5 and FIG. 6 show examples of a main controller GUI with different plugins active.

FIG. 5 is a plan view of an example of a main controller GUI 500 with a classification result viewer plugin (e.g., a controller plugin 108-112 of FIG. 1) active.

Figure 7:
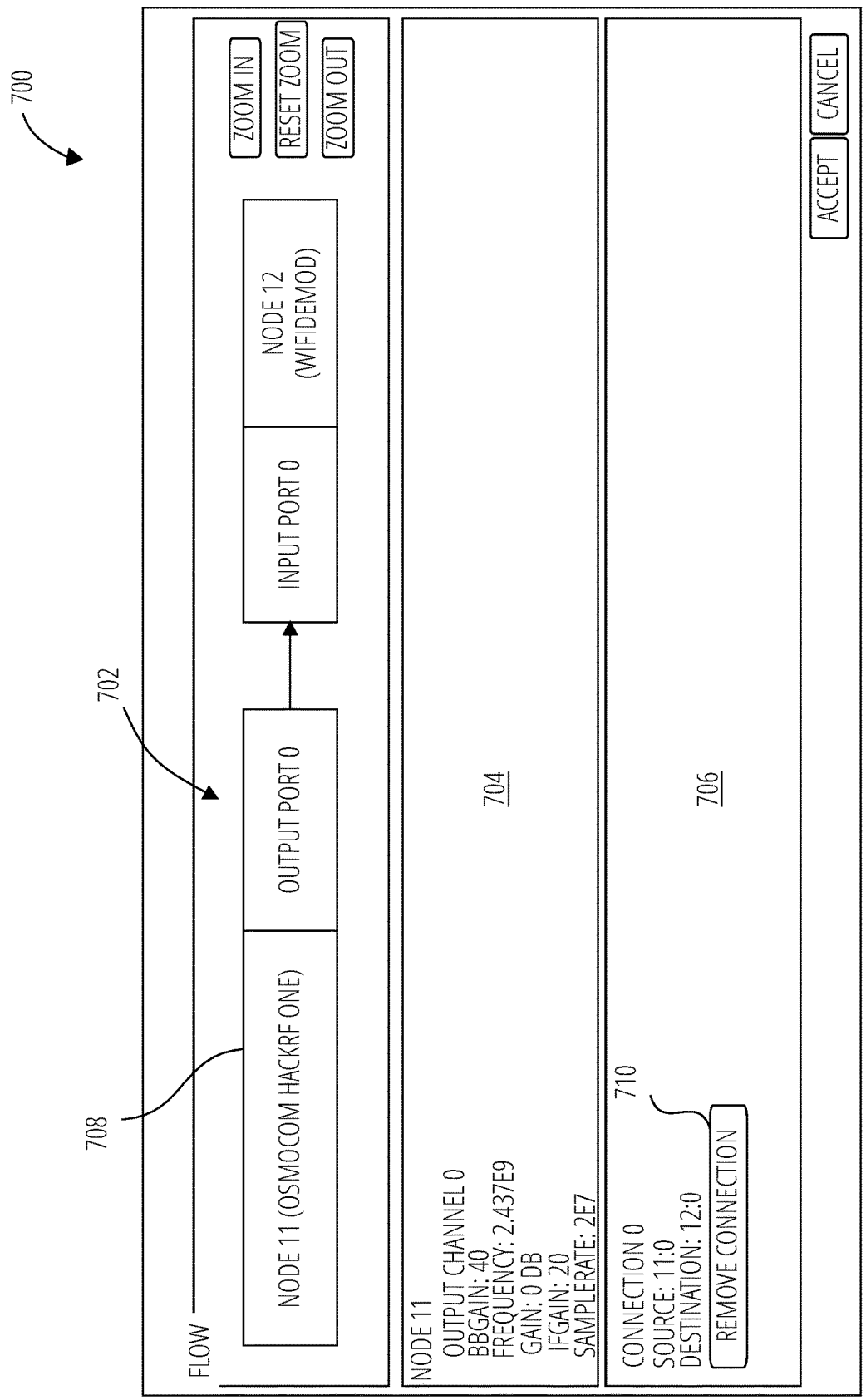
FIG. 7 is an example of a flow creation GUI according to some embodiments.

FIG. 6 is a plan view of the example of the main controller GUI 500 with a plugin (e.g., an ADS-B Mapper plugin) (e.g., a controller plugin 108-112 of FIG. 1) active. Referring to FIG. 5 and FIG. 6 together, the interface (e.g., main controller GUI 500) allows the user to view registered data interfaces 502, registered processing nodes 504, and registered controller plugins 506 and their status (left hand side of the main controller GUI 500). It also allows the users to generate flows 508 using currently registered components (registered data interfaces 502, registered processing nodes 504, and registered controller plugins 506), as shown in FIG. 7, and view the current status of those flows 508. Part of the GUI (main controller GUI 500) is also assigned to display the controller plugin output 510 (right hand side of the main controller GUI 500). By way of non-limiting example, in FIG. 5 the controller plugin output 510 includes a signal classification interface 512. Also by way of non-limiting example, in FIG. 6 the controller plugin output 510 includes a map 602.

FIG. 7 is an example of a flow creation GUI 700 according to some embodiments. The flow creation GUI 700 includes a flow editor 702, a node information field 704, and a connection interface 706. The flow editor 702 is configured to enable a user to edit a flow 708, which may be displayed graphically in the flow editor 702. The flow editor 702 may also be configured to enable a user to import a flow (e.g., load a flow from a saved file), and work from template files including flows. The node information field 704 is configured to display information about the nodes of the flow 708 (e.g., node 11, node 12 in FIG. 7). The connection interface 706 is configured to enable the user to remove connections (e.g., using a remove connection selection 710). As a specific non-limiting example, the flow editor 702 shows an output port (output port 0) of Node 11 (OSMOCOM HackRF One) connected to an input port (input port 0) of node 12 (WiFiDEMOD).

Each controller plugin may provide the following information: a string representing the type of the plugin, information about plugin-wide configuration options, and information about the input channels. The plugin also implements functionality to: load settings from a configuration file, activate the plugin given a configuration from user input, deactivate the plugin, reconfigure a plugin that has already started, input samples, and signals to request samples and indicate the plugin has been deactivated. In addition, plugins designed for a GUI can provide an interface (e.g., a QWidget) that is incorporated into the controller frontend GUI interface. By way of non-limiting example, plugins may be configured to provide a view of classification results, signal clusters, IQ samples, and an ADS-B data mapper. For the ADS-B data mapper plugin, a Marble mapping library may be used to provide mapping capabilities.

Device interfaces are loaded as specified in the configuration file. A data interface may load and use multiple data interface plugins. Each plugin exposes one or more channels. The data interface is responsible for interacting with the controller and taking data from the data interface plugins and providing them to the other nodes as needed to complete the flow while leaving the data generation to the plugins themselves.

Each plugin provides the following information: a string representing the source type, and information about the available channels. The plugin also implements functionality to: load settings from a configuration file, activate and deactivate a channel in the plugin given a configuration from the controller, reconfigure a plugin that has already started, signal to indicate the plugin deactivation, and generate data. By way of non-limiting examples, plugins may be implemented to provide constant data, read in IQ values from a file, interact with USRP SDR devices, interact with HackRF One devices, provide signal classification data from various sources, provide signal clustering data from various sources, and provide an ADS-B Decoder.

For the USRP and HackRF One device plugins, GNU Radio may be used to retrieve samples and a custom sample export block to export the samples to the output channel. For the ADS-B decoder, an RTL-SDR device with dump 1090 may be used to decode the signals.

Processing nodes are loaded as specified in the configuration file. A processing node can load multiple plugins, but only one plugin may be active at any given time. The processing node is responsible for: interacting with the controller, retrieving data from the previous node or nodes in the flow to provide to the plugin, taking data from the plugin, and providing the data to the next node or nodes in the flow. The processing of the data itself is handled by the activated plugin. Each processing node plugin provides the following information: a string representing the type of capability, information about capability-wide configuration options, and information about the input and output channels. The capability also implements functionality to: load settings from a configuration file, activate the capability given a configuration from the controller, deactivate the capability, input data, signal to request data and indicate the plugin deactivation, reconfigure a plugin that has already started, and generate output data if needed.

By way of non-limiting examples, plugins to pass data to the next node, perform Wi-Fi signal demodulation, and perform wireless signal classification may be implemented. The pass-through plugin is useful for debugging and performance testing. The Wi-Fi demodulation plugin attempts to demodulate IQ samples into Wi-Fi packets and save the Wi-Fi packets to a PCAP file using GNU Radio, the gr-IEEE 802.11 standard and gr-foo modules, and a custom sample import block to input samples from the input channels. The classification plugin acts similar to the signal classification data interface except it decouples (e.g., completely decouples) the source from itself.

When registering, plugins may provide information about additional parameters they support to the controller. The additional parameters may be configured by the user. The supported configuration option types may include, for example: arrays, booleans, doubles, integers, JSON strings, ranges, selections, and strings. Arrays and ranges have a subtype of either integer or double. JSON values act as a "raw" input type. Selection types may involve lists of values a user can choose from. These options may be presented to the user while configuring a chain. The options may be sent to the nodes during chain activation.

Each channel includes channel-specific configuration options as well as the data type allowed represented as a string and the expected size of the data type. A data type may be fixed-sized or dynamic in nature. For example, a data type may be "complex float 32," representing a sample being a complex value made up of two 32-bit floating point values. In that case, the data type would be an 8-byte fixed-size data type. Another example of a data type would be "classification results," representing a sample being a result from processing samples. In this case, the data type may be dynamic in nature as it may contain a list of values.

Each component's output channel maintains a separate circular sample buffer for each connection. This allows performance information to be tracked and the latest samples to be sent every time sample sets centrally to save on processing, but are maintained independently for each connection, meaning that if two nodes receive samples from the same source node, the ability of one node to consume samples does not affect the ability of the other node to consume samples.

Each sample is represented by a byte array, which holds the data and a dictionary of tags for that sample. The byte arrays only have meaning to the plugins that directly interact with them and are treated as just bytes by the architecture as a whole. This allows new sample data types to be added to the system without any changes to the core system. Sample data types are represented by strings. The sample tag dictionary may be implemented using, for example, a QVariantMap, which allows multiple types of data to be sent in the same data structure. When moving samples between nodes, the exact packet format (particularly the data section) depends on whether or not the data type for the samples is fixed-sized or dynamic in nature. Each set of samples includes the following information:

format version the number of missed samples since the last request for samples the sample type string the size of the samples (or that they are dynamic in size)

the number of samples sent the sample data a dictionary of the sample tags

If the samples are fixed-sized, the sample data may be treated as a simple data buffer and the raw sample data may be read and written contiguously into that space using memory copies and may be done in parallel. On the other hand, if the samples are dynamically-sized, each sample is prepended by the size (in bytes) of the sample data and may be done serially.

Flows may be represented using a JSON format, which consists of a list of nodes with their configuration and a list of connection pairs. In some examples, flows may not be allowed to contain cycles, allowing computation of an activation order based on dependencies, the dependencies based on Kahn's Algorithm. A node may be dependent on any node it receives input from. Generally, this means that data interfaces may have no dependencies and all processing nodes and controller plugins may have at least one dependency. Once the activation order is determined, nodes are activated in that order waiting for dependencies (e.g., all dependencies) of that node to successfully activate before continuing. As part of the activation, output channels may send back the port that will serve samples to the next node. That information is then sent along with the configuration information when activating a node with dependencies.

Systems according to embodiments disclosed herein are evaluated based on processing throughput as well as networking throughput. As used herein, the term "processing throughput" refers to how well input is handled from multiple SDRs at different sample rates. As used herein, the term "networking throughput" refers to how well data transferred between nodes is handled. For plugins (e.g., all plugins), a data type of "complex float 32" may be used, representing a complex value with each component being a 32-bit float value, making it a fixed-sized data type of size 8 bytes. Tests to evaluate the processing throughput and networking throughput may be performed on a computing device (e.g., running Ubuntu 18.04.02 LTS).

An evaluation of processing throughput was conducted using a HackRF One, USRP B210, and USRP X310 at different sample rates to determine how much signal bandwidth may be handled from the standpoint of processing. Data Interface plugins built for USRP and HackRF One devices were used in the evaluation. For the flow, a data interface node was started up with an appropriate plugin loaded. No other node was connected to the data interface node. To determine whether or not the system could handle the processing load, the modules were run for an hour. If an "overflow" notification was seen, it was determined that processing at some point along the communication path was not keeping up with samples being sent from the device, and the sample rate was considered to be too high. Such sample rates considered to be too high may take place for a variety of reasons, including the use of certain USB bus controllers, lack of a dedicated central processing unit (CPU), or a slow connection between the device and the computer. For this test, the node was run using an Intel Xeon E-2186 (2.9 GHz) processor. The HackRF One and USRP B210 were both connected via USB (USB 3.0 ports) on the computer. The USRP X310 is connected directly to a 1 Gbps Ethernet port on the computer. Sample rates were tested in 1 MHz increments. The results are listed in Table I.

TABLE I

Processing Throughput Results

| | Device | | |
|---|---|---|---|
| | HackRFOne | USRP B210 | USRP 310 |
| Max Sample Rate (MHz) | 20 | 18 | 20 |

An evaluation of network throughput was also performed. For this evaluation, a HackRF One was used at different sample rates to determine how much throughput would be achieved when sending data between nodes. A network throughput evaluation flow 800 used in this network throughput evaluation is illustrated in FIG. 8.

Figure 8:
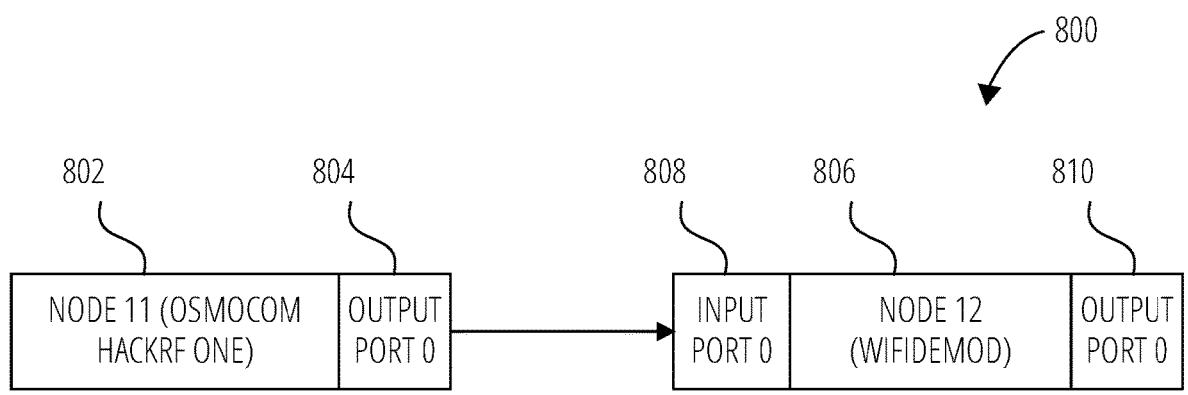
FIG. 8 illustrates a network throughput evaluation flow, according to some embodiments.

FIG. 8 illustrates a network throughput evaluation flow 800, according to some embodiments. The network throughput evaluation flow 800 includes a data interface node 802 (OSMOCOM HackRF ONE), an output port 804 (OUTPUT PORT 0) for the data interface node 802, a Wi-Fi demodulation processing node 806 (WiFiDEMOD), and an input port 808 (INPUT PORT 0) and an output port 810 (OUTPUT PORT 0) for the Wi-Fi demodulation processing node 806. Data may flow from the data interface node 802 to the Wi-Fi demodulation processing node 806 through the output port 804 and the input port 808. The data interface node 802 may have a HackRF One plugin loaded. The Wi-Fi demodulation processing node 806 may include a pass-through processing node. The Wi-Fi demodulation processing node 806 (pass-through node) may not actually process the data. Rather, the Wi-Fi demodulation processing node 806 may simply forward the data. The Wi-Fi demodulation processing node 806 was programmed to record how many samples from the HackRF were received as well as how many were lost at the source and destination nodes. The evaluation using the network throughput evaluation flow 800 was run with two node setups. For the first setup, both nodes were on the same physical machine, running on an Intel Xeon E-2186 (2.9 GHz) processor. For the second setup, each node was implemented on its own separate machine with a gigabit Ethernet switch in between. The HackRF One component (data interface node 802) was run on an Intel Xeon E-2186 (2.9 GHz) processor, while the pass-through node (WiFi demodulation processing node 806) was run on an Intel Xeon E-2176 (2.7 GHz) processor. Each test was run for 15 minutes. The results are shown in Table II.

TABLE II

Networking Throughput Results

| | | (% of Total) | | | |
|---|---|---|---|---|---|
| Setup | Sample Rate (MHz) | Received and Processed | Remote Lost | Local Lost | Total Samples |
| Single Node | 10 | 99.994 | 0.000 | 0.006 | 8904366826 |
| | 15 | 99.993 | 0.000 | 0.007 | 13294550485 |
| | 20 | 99.997 | 0.000 | 0.003 | 18088607575 |

TABLE II-continued

Networking Throughput Results

|  |  | (% of Total) | | | |
| --- | --- | --- | --- | --- | --- |
| Setup | Sample Rate (MHz) | Received and Processed | Remote Lost | Local Lost | Total Samples |
| Multiple Nodes | 10 | 99.097 | 0.884 | 0.019 | 8896982609 |
|  | 15 | 95.943 | 4.043 | 0.014 | 13191724683 |
|  | 20 | 72.162 | 27.832 | 0.006 | 18254974947 |

As can be seen, when the nodes were implemented on the same machine, no samples were lost due to the network. A small percentage of packets lost locally are due to the local receive buffer filling up before samples were being processed during startup. After starting up, processing keeps up with the incoming samples. This also explains the decreased percentage of samples lost locally as the sample rate increases. When multiple nodes are used, sample loss occurs due to network delay. The percentage of samples lost increases as the sample rate used increases. A small percentage of samples are lost locally as well. Similar to local sample loss when nodes were running on the same machine, the local samples lost when on separate machines occurs generally only at the very beginning. The higher percentage of local samples lost when running on multiple machines may be accounted for by the fact that the processing node was running on the slower machine when the nodes were split.

The network loss may mainly be attributed to two factors. First, both the HackRF One and USRP devices used smaller data types (line-format) than what was being transferred. For instance, a HackRF One's resolution is 8-bits per I or Q sample, making the actual sample size 16-bits. However, the GNU Radio representation received was 32-bits of resolution per I or Q sample, making the actual size 64-bits. This means the plugin is attempting to move four times as much data. Second, neither HackRF One nor the Ettus devices use encrypted packets when transferring data to the host. This means traffic between the nodes incurs additional overhead from the security used.

Disclosed herein is a distributed architecture that allows processing components to be mixed and matched in a variety of configurations to best suit the classification and processing requirements of the desired application. A prototype implementation of a system in accordance with embodiments disclosed herein was used to show the practicality and utility of systems according to embodiments disclosed herein. It was shown that systems according to embodiments disclosed herein are easily expandable and flexible in terms of processing flows, changing components, and heterogeneous processing capabilities. The prototype implementation was evaluated in terms of both processing throughput and networking throughput.

Figure 9:
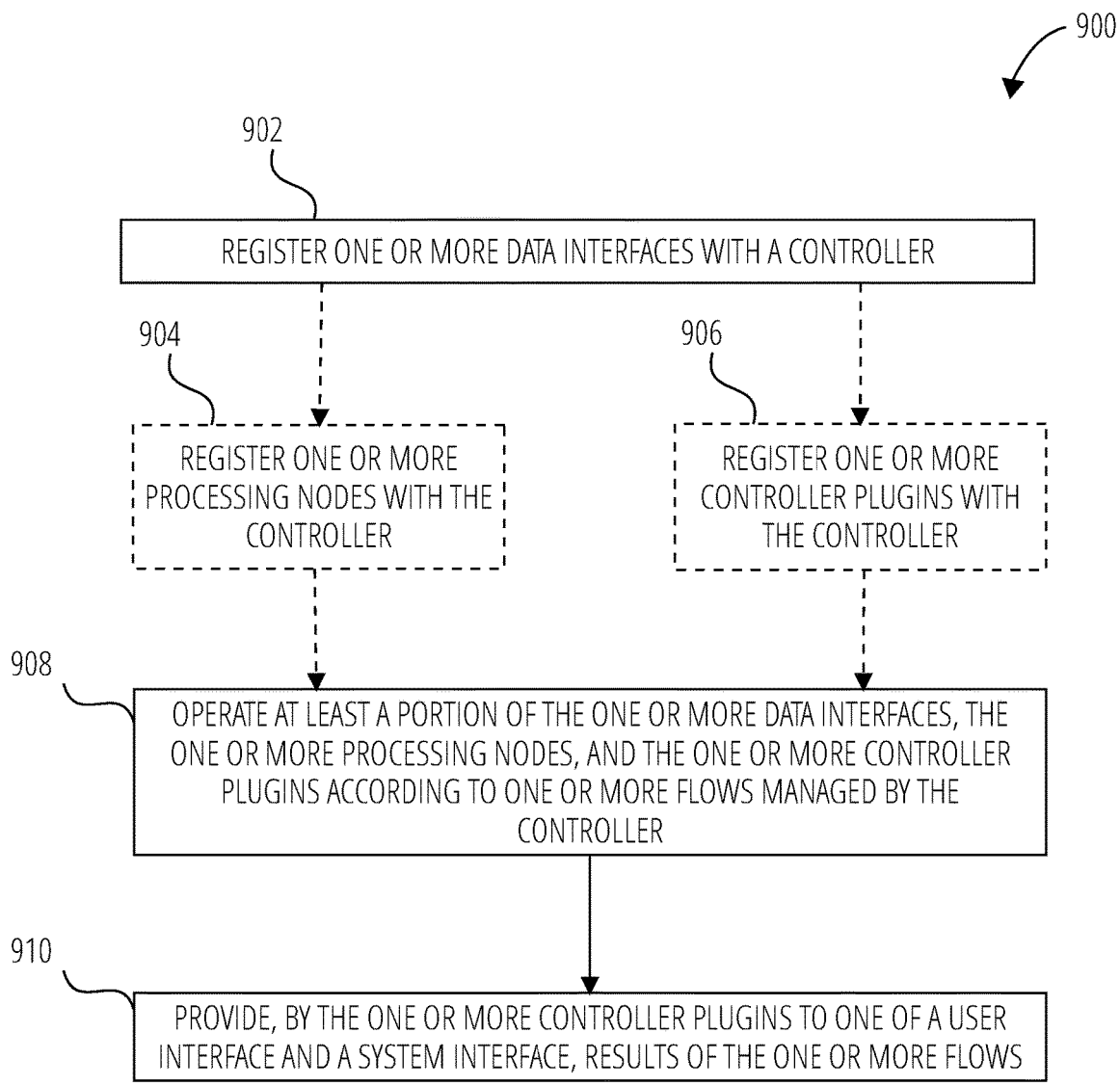
FIG. 9 is a flowchart illustrating a method of operating a computing system, according to some embodiments.

FIG. 9 is a flowchart illustrating a method 900 of operating a computing system, according to some embodiments. In operation 902 the method 900 registers one or more data interfaces with a controller. In operation 904 the method 900 registers one or more processing nodes with the controller. In operation 906 the method 900 registers one or more controller plugins with the controller. It is noted that although operations 904, and 906, corresponding to registering one or more processing nodes, and one or more controller plugins, respectively, are included in the method 900, it is acknowledged that in some embodiments only one of operations 904 and 906 may be performed. Accordingly, operation 904 and operation 906 are illustrated in broken lines to indicate that they are optional. It is also noted that in some embodiments both of operations 904 and 906 may be performed.

In operation 908 the method 900 operates at least a portion of the one or more data interfaces, the one or more processing nodes, and the one or more controller plugins according to one or more flows managed by the controller. In some embodiments operating the at least the portion of the one or more data interfaces, the one or more processing nodes, and the one or more controller plugins according to the one or more flows includes operating a flow including only one of the one or more processing nodes and the one or more controller plugins (e.g., excluding the other of the one or more processing nodes and the one or more controller plugins). In some embodiments operating the at least the portion of the one or more data interfaces, the one or more processing nodes, and the one or more controller plugins according to the one or more flows includes operating a flow including both at least one of the one or more processing nodes and at least one of the one or more controller plugins. In some embodiments operating the at least the portion of the one or more data interfaces, the one or more processing nodes, and the one or more controller plugins according to the one or more flows includes comparing current wireless signal characteristics against a known baseline of wireless signal characteristics. In some embodiments operating the at least the portion of the one or more data interfaces and the one or more processing nodes according to the one or more flows includes detecting wireless signals associated with drone traffic in an airport environment. In some embodiments operating the at least the portion of the one or more data interfaces and the one or more processing nodes according to the one or more flows includes detecting signals communicating according to a SAS, and taking action to clear lower-tier use of the SAS responsive to a detection that the detected signals correspond to a higher-tier user.

In operation 910 the method 900 provides, by the one or more controller plugins to one of a user interface and a system interface, results of the one or more flows. In some embodiments providing the results of the one or more flows includes displaying the results of the one or more flows on an electronic display using a graphical user interface (GUI). In some embodiments the GUI includes a signal classification interface configured to present signal classification information regarding signals provided by the one or more data interfaces.

Figure 10:
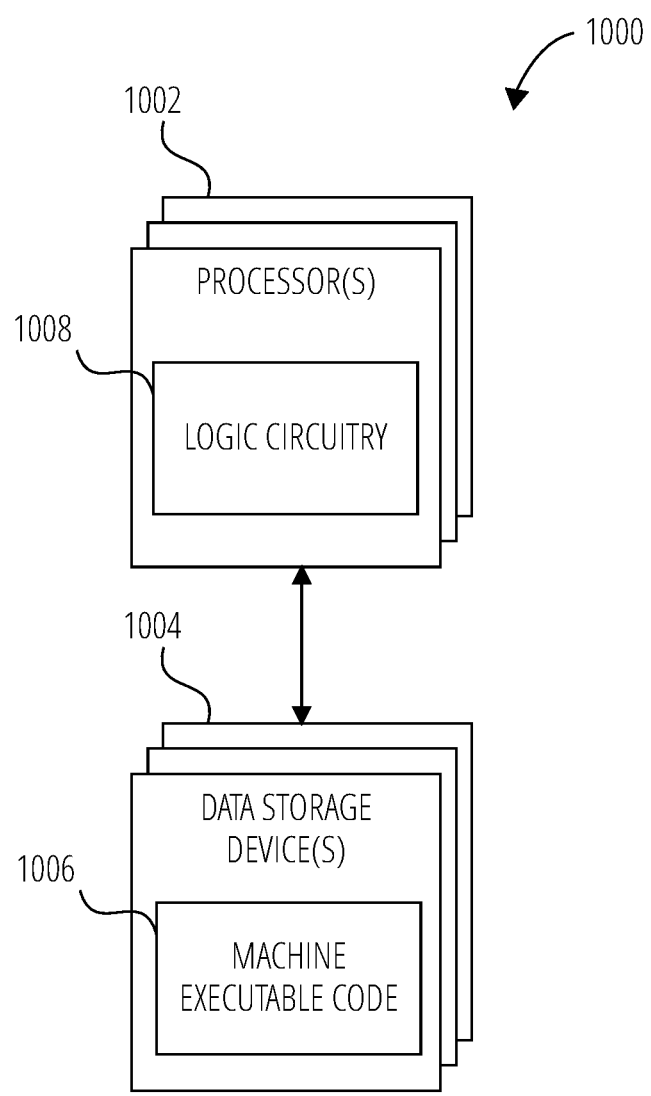
FIG. 10 is a block diagram of circuitry that, in some embodiments, may be used to implement various functions, operations, acts, processes, and/or methods disclosed herein.

It will be appreciated by those of ordinary skill in the art that functional elements of embodiments disclosed herein (e.g., functions, operations, acts, processes, and/or methods) may be implemented in any suitable hardware, software, firmware, or combinations thereof. FIG. 10 illustrates non-limiting examples of implementations of functional elements disclosed herein. In some embodiments, some or all portions of the functional elements disclosed herein may be performed by hardware specially configured for carrying out the functional elements.

FIG. 10 is a block diagram of circuitry 1000 that, in some embodiments, may be used to implement various functions, operations, acts, processes, and/or methods disclosed herein. The circuitry 1000 includes one or more processors 1002 (sometimes referred to herein as "processors 1002") operably coupled to one or more data storage devices (sometimes referred to herein as "storage 1004"). The storage 1004 includes machine executable code 1006 stored thereon and the processors 1002 include logic circuitry 1008. The machine executable code 1006 includes information describing functional elements that may be implemented by (e.g., performed by) the logic circuitry 1008. The logic circuitry 1008 is adapted to implement (e.g., perform) the functional elements described by the machine executable code 1006. The circuitry 1000, when executing the functional elements described by the machine executable code 1006, should be considered as special purpose hardware configured for carrying out functional elements disclosed herein. In some embodiments the processors 1002 may be configured to perform the functional elements described by the machine executable code 1006 sequentially, concurrently (e.g., on one or more different hardware platforms), or in one or more parallel process streams.

When implemented by logic circuitry 1008 of the processors 1002, the machine executable code 1006 is configured to adapt the processors 1002 to perform operations of embodiments disclosed herein. For example, the machine executable code 1006 may be configured to adapt the processors 1002 to perform at least a portion or a totality of the method 900 of FIG. 9. As another example, the machine executable code 1006 may be configured to adapt the processors 1002 to perform at least a portion or a totality of the operations discussed for the controller 102 of FIG. 1, the controller plugins 108-112 of FIG. 1, the data interfaces 104 of FIG. 1, the processing nodes 106 of FIG. 1, the data processing flows 200 of FIG. 2, the flows 300 of FIG. 3, the generic flow 400 of FIG. 4, the main controller GUI 500 of FIG. 5 and FIG. 6, the flow creation GUI 700 of FIG. 7, and the network throughput evaluation flow 800 of FIG. 8.

The processors 1002 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer is configured to execute functional elements corresponding to the machine executable code 1006 (e.g., software code, firmware code, hardware descriptions) related to embodiments of the present disclosure. It is noted that a general-purpose processor (may also be referred to herein as a host processor or simply a host) may be a microprocessor, but in the alternative, the processors 1002 may include any conventional processor, controller, microcontroller, or state machine. The processors 1002 may also be implemented as a combination of computing devices, such as a combination of a DSP and a microprocessor, a plurality of microprocessors, one or more microprocessors in conjunction with a DSP core, or any other such configuration.

In some embodiments the storage 1004 includes volatile data storage (e.g., random-access memory (RAM)), non-volatile data storage (e.g., Flash memory, a hard disc drive, a solid state drive, erasable programmable read-only memory (EPROM), etc.). In some embodiments the processors 1002 and the storage 1004 may be implemented into a single device (e.g., a semiconductor device product, a system on chip (SOC), etc.). In some embodiments the processors 1002 and the storage 1004 may be implemented into separate devices.

In some embodiments the machine executable code 1006 may include computer-readable instructions (e.g., software code, firmware code). By way of non-limiting example, the computer-readable instructions may be stored by the storage 1004, accessed directly by the processors 1002, and executed by the processors 1002 using at least the logic circuitry 1008. Also by way of non-limiting example, the computer-readable instructions may be stored on the storage 1004, transferred to a memory device (not shown) for execution, and executed by the processors 1002 using at least the logic circuitry 1008. Accordingly, in some embodiments the logic circuitry 1008 includes electrically configurable logic circuitry 1008.

In some embodiments the machine executable code 1006 may describe hardware (e.g., circuitry) to be implemented in the logic circuitry 1008 to perform the functional elements. This hardware may be described at any of a variety of levels of abstraction, from low-level transistor layouts to high-level description languages. At a high-level of abstraction, a hardware description language (HDL) such as an IEEE Standard hardware description language (HDL) may be used. By way of non-limiting examples, Verilog™, SystemVerilog™ or very large scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuitry 1008 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some embodiments the machine executable code 1006 may include an HDL, an RTL, a GL description, a mask level description, other hardware description, or any combination thereof.

In embodiments where the machine executable code 1006 includes a hardware description (at any level of abstraction), a system (not shown, but including the storage 1004) may be configured to implement the hardware description described by the machine executable code 1006. By way of non-limiting example, the processors 1002 may include a programmable logic device (e.g., an FPGA or a PLC) and the logic circuitry 1008 may be electrically controlled to implement circuitry corresponding to the hardware description into the logic circuitry 1008. Also by way of non-limiting example, the logic circuitry 1008 may include hard-wired logic manufactured by a manufacturing system (not shown, but including the storage 1004) according to the hardware description of the machine executable code 1006.

Regardless of whether the machine executable code 1006 includes computer-readable instructions or a hardware description, the logic circuitry 1008 is adapted to perform the functional elements described by the machine executable code 1006 when implementing the functional elements of the machine executable code 1006. It is noted that although a hardware description may not directly describe functional elements, a hardware description indirectly describes functional elements that the hardware elements described by the hardware description are capable of performing.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different subcombinations of some of the elements. For example, the phrase "A, B, C, D, or combinations thereof" may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

While the present disclosure has been described herein with respect to certain illustrated embodiments, those of ordinary skill in the art will recognize and appreciate that the present disclosure is not so limited. Rather, many additions, deletions, and modifications to the illustrated and described embodiments may be made without departing from the scope of the present disclosure as hereinafter claimed along with their legal equivalents. In addition, features from one embodiment may be combined with features of another embodiment while still being encompassed within the scope of the present disclosure.

What is claimed is:

1. A computing system, comprising:
   one or more data interfaces configured to provide an interface to a data source, the one or more data interfaces configured to provide samples of wireless signals received in an area monitored for unauthorized wireless activity;
   one or more other components including one or more controller plugins, one or more processing nodes, or both the one or more controller plugins and the one or more processing nodes; and
   a controller configured to:
      manage interactions between the one or more data interfaces and the one or more other components; and
      provide a flow creation interface to enable a user to chain together the one or more data interfaces and the one or more other components according to one or more flows;
      wherein the one or more controller plugins are configured to provide results of processing the samples of the wireless signals in the one or more flows to one of a user interface and a system interface, the results including signal classification information that classifies the wireless signals for indication of the unauthorized wireless activity in the monitored area.

2. The computing system of claim 1, wherein each of the controller, the one or more data interfaces, and the one or more other components are implemented in a common computing device.

3. The computing system of claim 1, wherein the controller, the one or more data interfaces, and the one or more other components are distributed among multiple computing devices.

4. The computing system of claim 1, wherein the one or more flows include a flow including at least one of the one or more data interfaces, at least one of the one or more processing nodes, and at least one of the one or more controller plugins.

5. The computing system of claim 1, wherein the one or more flows include a flow that does not include one of the one or more controller plugins.

6. The computing system of claim 1, wherein the one or more flows include a flow that does not include one of the one or more processing nodes.

7. The computing system of claim 1, wherein the one or more flows include a first flow and a second flow.

8. The computing system of claim 7, wherein the first flow and the second flow include a same one of the one or more data interfaces to enable both the first flow and the second flow to handle data from the same one of the one or more data interfaces.

9. The computing system of claim 1, wherein at least one of the one or more data interfaces is configured to provide an interface to a software defined radio.

10. The computing system of claim 1, wherein at least one of the one or more flows includes a signal classification processing node of the one or more processing nodes, the signal classification processing node configured to classify the wireless signals for indication of the unauthorized wireless activity.

11. The computing system of claim 1, wherein at least one of the one or more flows includes a dynamic flow.

12. The computing system of claim 1, wherein at least one of the one or more flows is configured to process the samples of the wireless signals in the monitored area comprising an airport environment.

13. The computing system of claim 1, wherein at least one of the one or more flows is configured to process the samples of the wireless signals in the monitored area comprising a power substation environment.

14. The computing system of claim 1, wherein at least one of the one or more flows is configured to process the samples of the wireless signals in a specific portion of a spectrum controlled by a spectrum access system.

* * * * *